Patented May 2, 1950

2,506,025

UNITED STATES PATENT OFFICE 2,506,025

ANTHRAQUINONE VAT DYESTUFFS

Walter Jenny, Reinach, near Basel, and Walter Kern, Sissach, Switzerland, assignors to Ciba Limited, Basel, Switzerland No Drawing. Application December 6, 1948, Serial No. 63,848. In Switzerland December 24, 1947

3 Claims. (Cl. 260—372)

According to the present invention, unexpectedly valuable vat dyestuffs are made by treating with an acylating agent a 1-acylamino-4-aminoanthraquinone, and so selecting the acylating agent and the 1-acylamino-4-aminoanthraquinone that one of the two acyl groups present in the final product is the residue of a benzene-1-carboxylic acid-3-dialkylsulphonamide and the other of such acyl groups is the residue of an aromatic carboxylic acid of the benzene series free from sulphonamido groups, and that a substituent is present at least in the anthraquinone nucleus or the aromatic nucleus of the residue of the carboxylic acid free from sulphonamido groups.

The 1-acylamino-4-aminoanthraquinones serving as starting materials can be obtained in known manner, for example, by monoacylating a 1:4-diaminoanthraquinone or by acylating a 1-amino-4-nitroanthraquinone and subsequently reducing the nitro group. The acylamino group in the 1-position may contain as an acyl residue, for example, the residue of a benzoic acid-3-dialkylsulphonoamide. In the dialkylsulphonamido-group the two alkyl residues are advantageously of low molecular weight, that is to say, they contain only few, for example, less than four, carbon atoms per alkyl residue. As examples there may be mentioned an N-diethylsulphonamido group and especially an N-dimethylsulphonamido group. The two alkyl residues of a sulphonamido group may be connected together by a bridge member, for example, by an oxygen atom or a methylene group, as in the case of sulphon-morpholido and sulphon-piperidido groups.

When a 1-(3'-dialkylsulphonamido)-benzoylamino-4-aminoanthraquinone is used as starting material it must be treated with an acylating agent which introduces the residue of an aromatic carboxylic acid of the benzene series free from sulphonamido groups. As examples of such acylating agents there may be mentioned reactive functional derivatives of benzoic acid, especially the acid halides and preferably the acid chloride. The residue of the cyclic carboxylic acid may contain substituents for example, a halogen atom, an alkoxy group or another substituent, which is not harmful in vat dyestuffs, such as an alkyl group, a cyano group or an alkylsulphone or arylsulphone group, such substituent being present advantageously in paraposition to the carboxylic acid group.

The vat dyestuffs may be made in the reverse manner by using as the starting material a 1-acylamino-4-aminoanthraquinone containing the residue of a cyclic carboxylic acid free from sulphonamido groups (see, for example, the residues mentioned above). In this case there must be used an acylating agent which is capable of introducing the residue of a benzene-1-carboxylic acid-3-dialkylsulphonamide.

The components must also be so chosen that a substituent is present in the anthraquinone nucleus or in the aromatic nucleus of the carboxylic acid free from sulphonamido groups or in both nuclei. As such a substituent there comes into consideration, as mentioned above, for example, a cyano, alkyl or alkoxy group and especially a halogen atom. In many cases especially favourable results are obtained with a halogen atom, advantageously a chlorine atom, which is present in a β-position in the anthraquinone nucleus, preferably in the 6- or 7-position.

It will be apparent from the foregoing that there may be used as starting materials, for example, 1-(3'-dimethyl-sulphonamido)-benzoylamino-4-aminoanthraquinone and its 6- or 7-chloro-derivative, 1-(3'-sulphon-morpholido)-benzoylamino-4-aminoanthraquinone and its 6- or 7-chloro-derivative, 1-(3'-sulphon-piperidido)-benzoylamino-4-aminoanthraquinone and its 6- or 7-chloro-derivative. In many cases mixtures of aminoanthraquinone components may be used, which contain both the 6- and 7-chloro-derivative. These aminoanthraquinone components may be reacted, for example, with functional derivatives of the following acids: 4-methoxybenzoic acid, 4-bromo- and especially 4-chloro-benzoic acid. When the starting material is substituted in the anthraquinone nucleus, there may be used a functional derivative of benzoic acid itself, especially benzoyl chloride.

Conversely, there come into consideration the following starting materials: 1-benzoylamino-4-amino-6- or -7-chloranthraquinone, 1-(4'-methoxy)-benzoylamino-4-aminoanthraquinone or its 6- or 7-chloro-derivative, 1-(4'-chloro- or -4'-bromo)-benzoylamino-4-aminoanthraquinone or its 6- or 7-chloro-derivative. Such aminoanthraquinone components may be reacted, for example, with functional derivatives, advantageously acid chlorides of the following acids: benzoic acid-3-dimethysulphonamide, benzoic acid-3-diethyl-sulphonamide, benzoic acid-3-sulphon-morpholide, benzoic acid - 3 - sulphon - piperidide or 4-chlorobenzoic acid-3-dimethyl-sulphonamide.

The treatment of the aminoanthraquinone components with acylating agents may be conducted with advantage in an inert solvent or diluent, advantageously of relatively high boiling point such as nitrobenzene or mono-, di- or trichlorobenzene or naphthalene, generally at a high temperature, for example, 100° C. to the boiling point of the solvent or diluent in question.

The vat dyestuffs obtained by the process of the invention correspond to the general formula

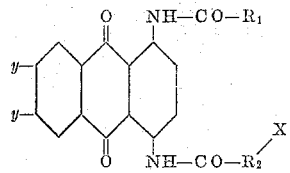

in which $R_1$ —CO— represents the residue of an aromatic carboxylic acid of the benzene series free from sulphonamido groups, X represents a dialkylsulphonamido group, one $y$ stands for hydrogen and the other $y$ for hydrogen or for a substituent consisting of a halogen atom and $R_2$ represents a benzene nucleus to which the —CO— group and the group X are bound in the 1:3-position, and a substituent is present at least in the anthraquinone nucleus or in the nucleus $R_1$.

These vat dyestuffs can be used as pigment dyestuffs or for dyeing and especially for printing a very wide variety of fibers, such as wool, leather or silk, but principally vegetable cellulosic fibers such as linen, cotton, artificial silk or staple fibers of regenerated cellulose. They may also be used in the form of their leuco ester salts (especially sulfuric acid esters), obtainable by methods known in connection with dyestuffs of this class.

The following examples illustrate the invention, the parts and percentages being by weight unless otherwise stated and the relationship of parts by weight to parts by volume being the same as that of the kilogram to the liter:

Example 1

27.5 parts of benzoic acid-3-sulphon-morpholide are suspended in 370 parts of dry nitrobenzene and, after the addition of 15 parts of thionyl chloride, stirred for 1½ hours at 90–100° C. 37.5 parts of 1 - benzoylamino - 4 - amino - 6 - chloranthraquinone are then added and the whole is stirred for a further 2 hours at 125–130° C. The dyestuff which precipitates upon cooling in the form of small red crystals and which corresponds to the probable formula

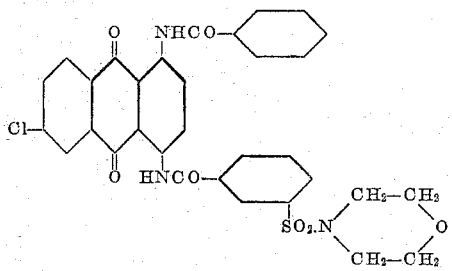

is separated by filtering with suction, well washed with boiling alcohol and dried. It dissolves in concentrated sulfuric acid with a red-violet coloration and dyes cotton from a violet vat very fast, pure bluish-pink tints.

Benzoic acid-3-sulphon-morpholide may be prepared as follows:

11 parts of benzoic acid-3-sulphochloride are added slowly with thorough stirring to a solution of 17 parts of morpholine in 150 parts of water at ordinary temperature. When the addition is complete, the temperature is raised, while stirring, to 50° C. in the course of 2 hours, and then the whole is allowed to cool. The sulphon-morpholide precipitated with dilute hydrochloric acid forms a white crystalline powder. Upon recrystallisation from water the product is obtained in the form of handsome colorless lamellae.

1 - benzoylamino - 4 - amino - 6 - chloranthraquinone can be prepared by the benzoylation and subsequent reduction of 1-amino-4-nitrochloranthraquinone (compare United States Patent No. 2,134,654, Example 3). 15 parts of 1-amino-4-nitro-6-chloranthraquinone are suspended in 150 parts of dry ortho-dichlorobenzene and, after the addition of 15 parts of benzoyl chloride, the whole is stirred for 3 hours at the boil. The yellow benzoylamino-compound, which is isolated by cooling, filtration, and washing with alcohol is suspended in 7 times its weight of ortho-dichlorobenzene, mixed with twice its weight of phenyl-hydrazine and stirred for 1 hour at 135–140° C. Upon cooling, 1-benzoylamino-4-amino-6-chloranthraquinone crystallises in violet needles.

Example 2

27.5 parts of benzoic acid-3-sulphon-morpholide are suspended in 380 parts of dry nitrobenzene and, after the addition of 15 parts of thionyl chloride, stirred for 1½ hours at 90–100° C. The whole is then mixed with 30 parts of 1-(para-methoxy - benzoylamino) - 4 - amino - 6 - chloranthraquinone and the whole is stirred for 2 hours at 120–130° C. The dyestuff which precipitates upon cooling in the form of small red crystals and which corresponds to the probable formula

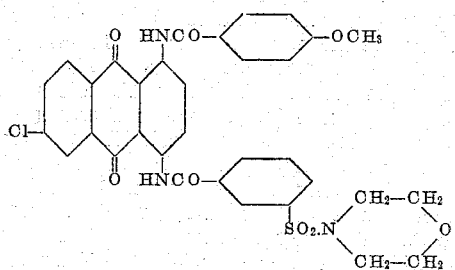

is separated by filtering with suction, washed well with boiling alcohol and dried. It dissolves in concentrated sulfuric acid with an olive brown coloration and dyes cotton from a red-violet vat very fast bluish-pink tints.

1 - (para - methoxybenzoylamino) -4-amino-6-chloranthraquinone may be prepared, as described in Example 1, by acylating 1-amino-4-nitro-6-chloranthraquinone with para-methoxybenzoyl chloride and subsequently reducing the nitro-group. When recrystallised from ortho-dichlorobenzene the compound forms small red-brown needles, which dissolve in concentrated sulfuric acid with an olive coloration.

Example 3

18.5 parts of benzoic acid-3-dimethylsulphonamide are suspended in 270 parts of dry nitrobenzene and, after the addition of 12 parts of thionyl chloride and 0.5 part of pyridine, stirred for 1½ hours at 70–80° C. There are then added 30 parts of 1-benzoylamino-4-amino-6-chloranthraquinone and the whole is stirred for 2 hours at 125–130° C. The dyestuff which separates upon cooling in the form of small red needles and which corresponds to the probable formula

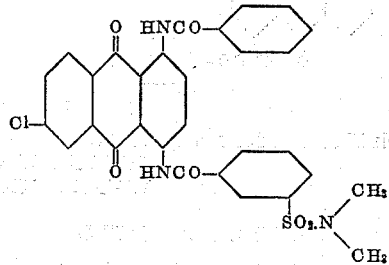

is separated by filtering with suction, washed well with boiling alcohol and dried. It dissolves in concentrated sulfuric acid with a violet-red coloration and dyes cotton from a violet vat very fast pure pink tints.

Benzoic acid-3-dimethylsulphonamide can be prepared in the same manner as the corresponding sulphon-morpholide (see Example 1).

Example 4

55 parts of 1-amino-4-(3'-dimethylsulphonamido-benzoylamino)-7-chloranthraquinone are suspended in 400 parts of dry nitrobenzene and, after the addition of 45 parts of benzoyl chloride, stirred for 3 hours at 125–135° C. The dyestuff, which precipitates upon cooling in the form of small red crystals and which corresponds to the probable formula:

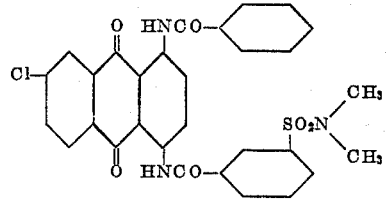

is separated by filtering with suction washed well with boiling alcohol and dried. It dissolves in concentrated sulfuric acid with a red coloration and dyes cotton from a violet vat very fast pure pink tints.

1-amino-4-(3'-dimethylsulphonamido-benzoylamino)-7-chloranthraquinone may be prepared, for example, in the following manner: 46 parts of benzoic acid - 3 - dimethylsulphonamide are suspended in 280 parts of dry nitrobenzene and after the addition of 30 parts of thionyl chloride and 0.5 part of pyridine stirred for 1½ hours at 70–80° C. The whole is then mixed with 60 parts of 1-amino-4-nitro-6-chloranthraquinone and stirred for a further 2 hours at 125–135° C. The 1-nitro - 4 - (3'-dimethyl-sulphonamido-benzoylamino) - 7 - chloranthraquinone, which precipitates upon cooling in the form of yellow crystals is separated by filtering with suction, washed well with hot alcohol, and then suspended in 10 times its weight of ortho-dichlorobenzene and, after the addition of 3 times its weight of phenylhydrazine, stirred for 1 hour at 135–145° C. Upon cooling, 1-amino-4-(3'-dimethyl-sulphonamidobenzoylamino) - 7 - chloranthraquinone precipitates in the form of violet crystals.

Example 5

23 parts of benzoic acid-3-dimethylsulphonamide are suspended in 320 parts of dry nitrobenzene and after the addition of 15 parts of thionyl chloride and 0.5 part of pyridine, stirred for 1½ hours at 70–80° C. The whole is then mixed with 37 parts of 1-(4'-chlorobenzoylamino)-4-aminoanthraquinone, and stirred for a further 2 hours at 120–130° C. The dyestuff, which precipitates upon cooling in the form of orange red crystals and which corresponds to the probable formula

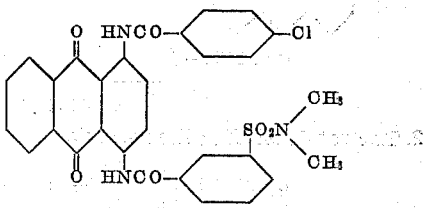

is separated by filtering with suction and washed well with boiling alcohol. It dissolves in concentrated hydrochloric acid with a red coloration and dyes cotton from a violet vat fast orange colored tints.

Example 6

27 parts of 4-chlorobenzoic acid-3-dimethylsulphonamide are suspended in 320 parts of dry nitrobenzene and, after the addition of 16 parts of thionyl chloride and 0.5 part of pyridine, stirred for 1½ hours at 90–100° C. The whole is then mixed with 37 parts of 1-amino-4-(3'-chlorobenzoylamino)-anthraquinone and stirred for a further 2 hours at 120–130° C. The dyestuff which precipitates upon cooling in the form of orange colored crystals and which corresponds to the probable formula

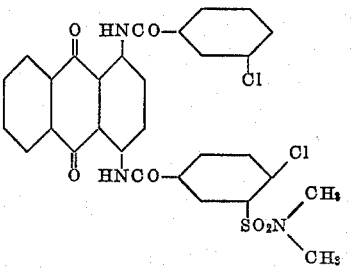

is separated by filtering with suction, washed with boiling alcohol and dried. It dissolves in concentrated sulfuric acid with a red coloration and dyes cotton orange tints from a violet vat.

4-chlorobenzoic acid-3-dimethylsulphonamide is prepared in the same manner as benzoic acid - 3 - sulphon - morpholide (see Example 1) from the corresponding sulphochloride and an excess of dimethylamine in aqueous solution.

Example 7

1 part of the dyestuff obtained as described in Example 1 is vatted at 50° C. in 100 parts of water by the addition of 4 parts by volume of caustic soda solution of 36° Bé. and 2 parts of sodium hydrosulphite. The resulting stock vat is added to a dyebath consisting of 3000 parts of water, 8 parts by volume of caustic soda solution of 36° Bé. and 3 parts of sodium hydrosulphite. 100 parts of cotton are entered at 25° C., 45 parts of sodium chloride are added after 15 minutes, and dyeing is carried on at 25–30° C. for 1 hour. The cotton is then finished in the usual manner. After soaping there are obtained very fast bluish pink tints.

Reference is made to the applicant's copending application, Ser. No. 63,847, filed on even date herewith, which claims subject matter disclosed but not claimed in the instant application.

Having thus described the invention, what is claimed is:

1. A vat dyestuff which corresponds to the formula

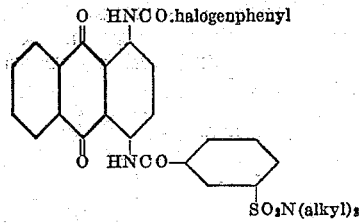

2. The vat dyestuff of the formula

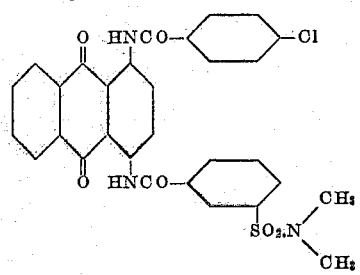

3. A vat dyestuff which corresponds to the formula

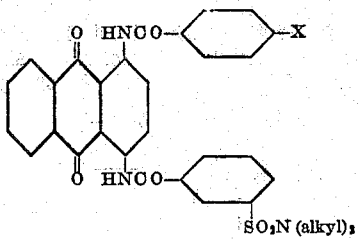

in which X stands for a halogen atom.

WALTER JENNY.
WALTER KERN.

REFERENCES CITED

The following references are of record in the file of this patent:

UNITED STATES PATENTS

| Number | Name | Date |
|---|---|---|
| 2,190,751 | Zerweck et al. | Feb. 20, 1940 |